United States Patent [19]
Wang

[11] Patent Number: 5,611,622
[45] Date of Patent: Mar. 18, 1997

[54] PACIFIER AND THERMOMETER ASSEMBLY

[76] Inventor: Mac Wang, 4F., No.8, Alley 4, Lane 131, Chang An St., Lu Chou Shiang, Taipei Hsien, Taiwan

[21] Appl. No.: 606,442

[22] Filed: Feb. 23, 1996

[51] Int. Cl.$^6$ ............................ G01K 13/00; A61B 5/00; A61J 17/00
[52] U.S. Cl. .................... 374/151; 128/736; 606/236; 606/234; 606/235
[58] Field of Search ............................ 374/151; 128/736; 606/234, 235, 236

[56] References Cited

U.S. PATENT DOCUMENTS

| | | | |
|---|---|---|---|
| 3,117,450 | 1/1964 | Hoy | 374/151 |
| 4,072,054 | 2/1978 | Blouin et al. | 374/151 |
| 5,019,095 | 5/1991 | Lu | 374/151 |
| 5,078,734 | 1/1992 | Noble | 606/234 |
| 5,178,466 | 1/1993 | Chiu | 374/151 |
| 5,178,467 | 1/1993 | Chen | 374/151 |
| 5,300,089 | 4/1994 | Sassin | 606/234 |
| 5,312,187 | 5/1994 | Chiu | 374/151 |

*Primary Examiner*—Diego F. Gutierrez
*Attorney, Agent, or Firm*—Bacon & Thomas

[57] ABSTRACT

The temperature detection probe of a digital thermometer may be detachably disposed within a pacifier nipple by forcibly inserting a coupling rod having a rounded split head which carries the probe through a stub tube having a circular bottom plate securing the base of the nipple to a base plate. A cover is provided for enclosing the nipple when the pacifier is not being used.

4 Claims, 4 Drawing Sheets

PACIFIER AND THERMOMETER ASSEMBLY

BACKGROUND OF THE INVENTION

The present invention relates to a pacifier and thermometer assembly which comprises a pacifier, and a thermometer detachably connected to the pacifier, wherein the pacifier includes a base plate, a nipple mounted in a threaded hole on the base plate, and a threaded locating member threaded into the threaded hole of the base plate to hold down the nipple.

Measuring the body temperature of a baby with a thermometer is not an easy job because the baby does not keep quiet during measuring. Various pacifiers with a detachable thermometer have been developed. When the thermometer is attached and the nipple of the pacifier is held by the teeth of the baby, the body temperature of the baby is measured. FIG. 1 shows a pacifier and thermometer assembly according to the prior art, which includes a pacifier 90, and a thermometer 80 detachably connected to the pacifier 90. When the thermometer 80 is attached to the pacifier 90, the assembly is too heavy to be comfortably held by the teeth of the baby. Furthermore, the battery 81 may fall out of the thermometer 80 when the pacifier 90 is heavily shaken. Therefore, the thermometer 80 must be disconnected from the pacifier 90 when not being used to measure the body temperature of the baby. However, when the thermometer 80 is disconnected from the base plate 92 of the pacifier 90, the nipple 91 tends to be pulled out of the base plate 92 and swallowed by the baby.

SUMMARY OF THE INVENTION

The present invention provides a pacifier and thermometer assembly which eliminates the aforesaid problem. According to the present invention, the nipple is mounted in a threaded hole at the base plate and secured in place by a locating member. The locating member comprises a peripherally threaded bottom plate that is threaded into the threaded hole of the base plate and secures an outward bottom flange of the nipple against a shoulder portion inside the threaded hole of the base plate, and a stub tube is inserted through the threaded hole of the base plate into the inside of the nipple.

DETAILED DESCRIPTION OF THE PREFERRED EMBODIMENTS

Figure 1:
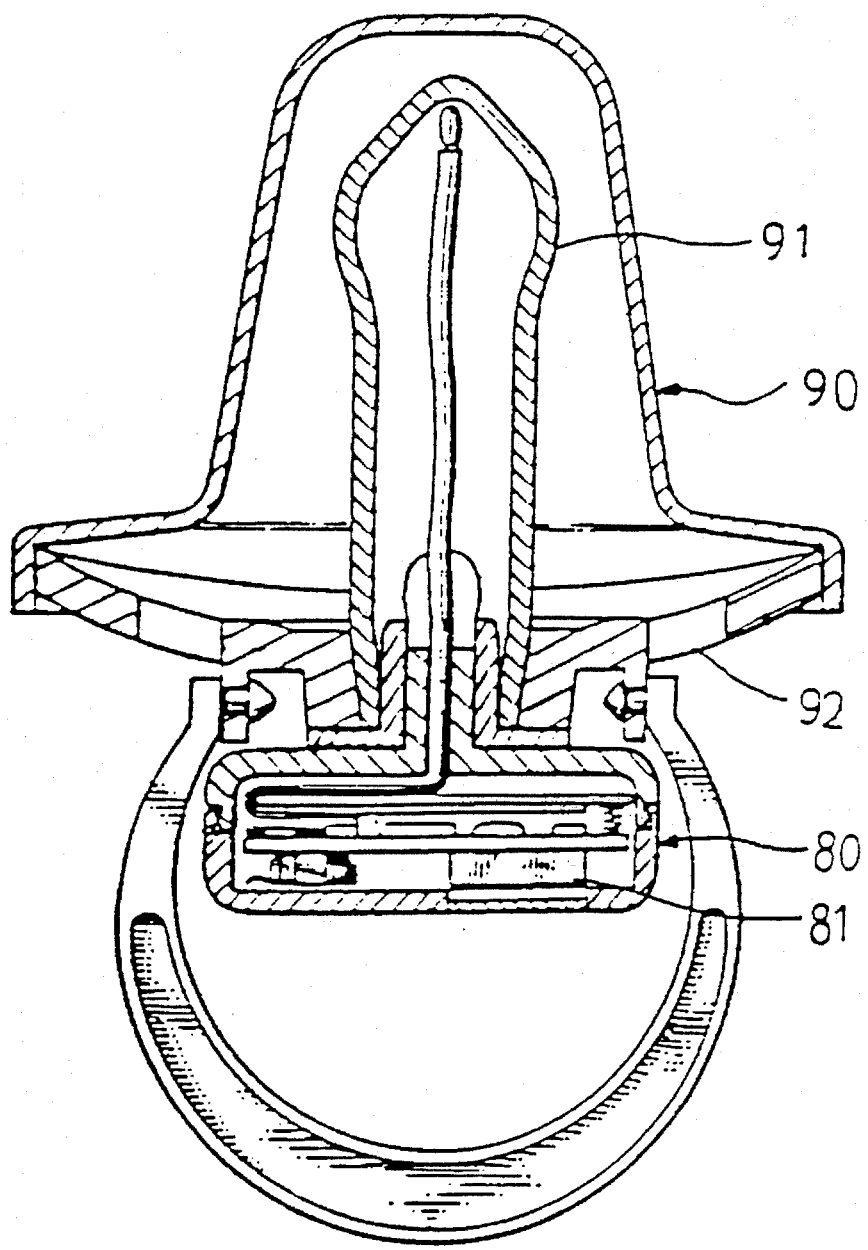
FIG. 1 is a pacifier and thermometer assembly according to the prior art.
Figure 2:
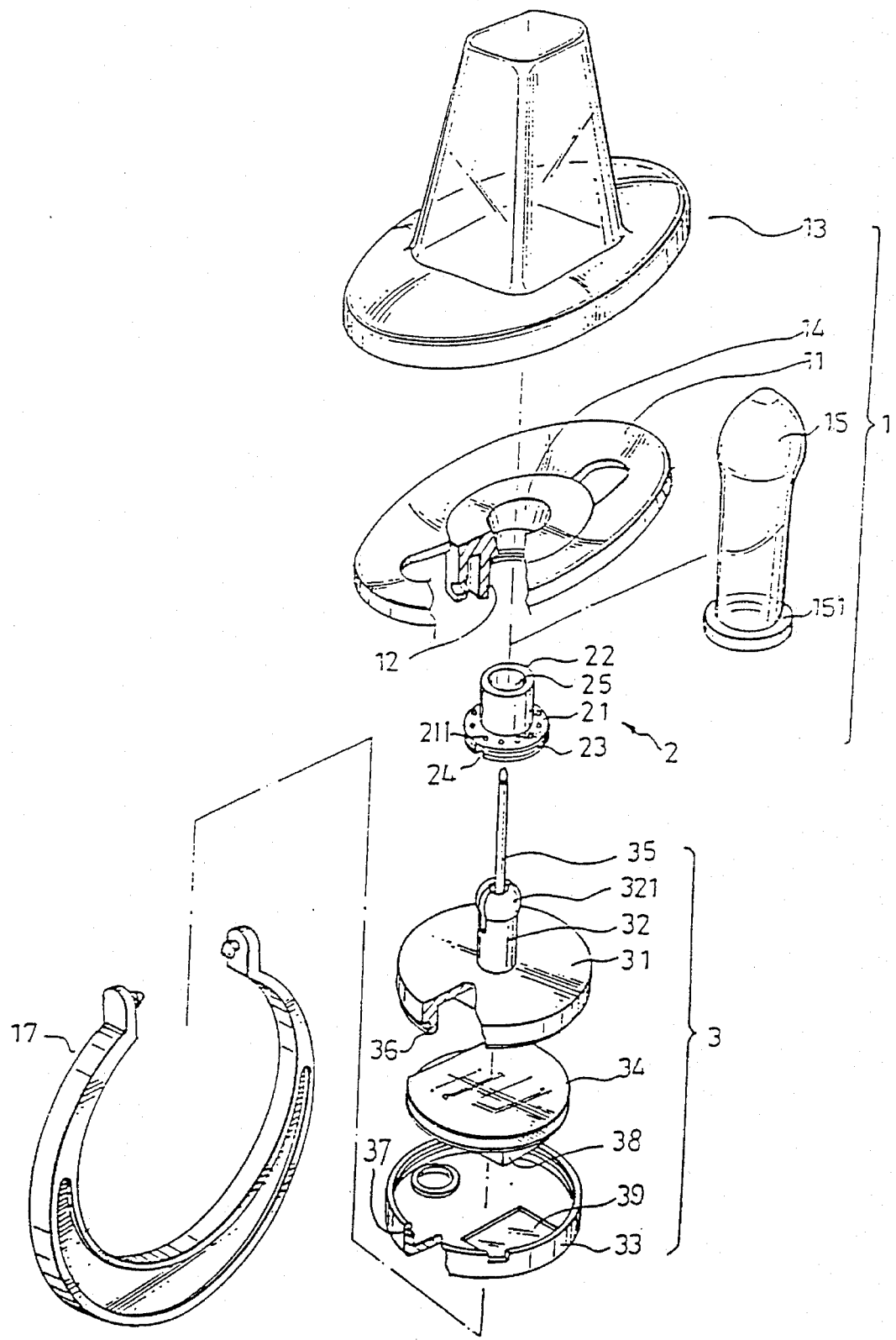
FIG. 2 is an exploded perspective view of a pacifier and thermometer assembly according to the present invention.
Figure 3:
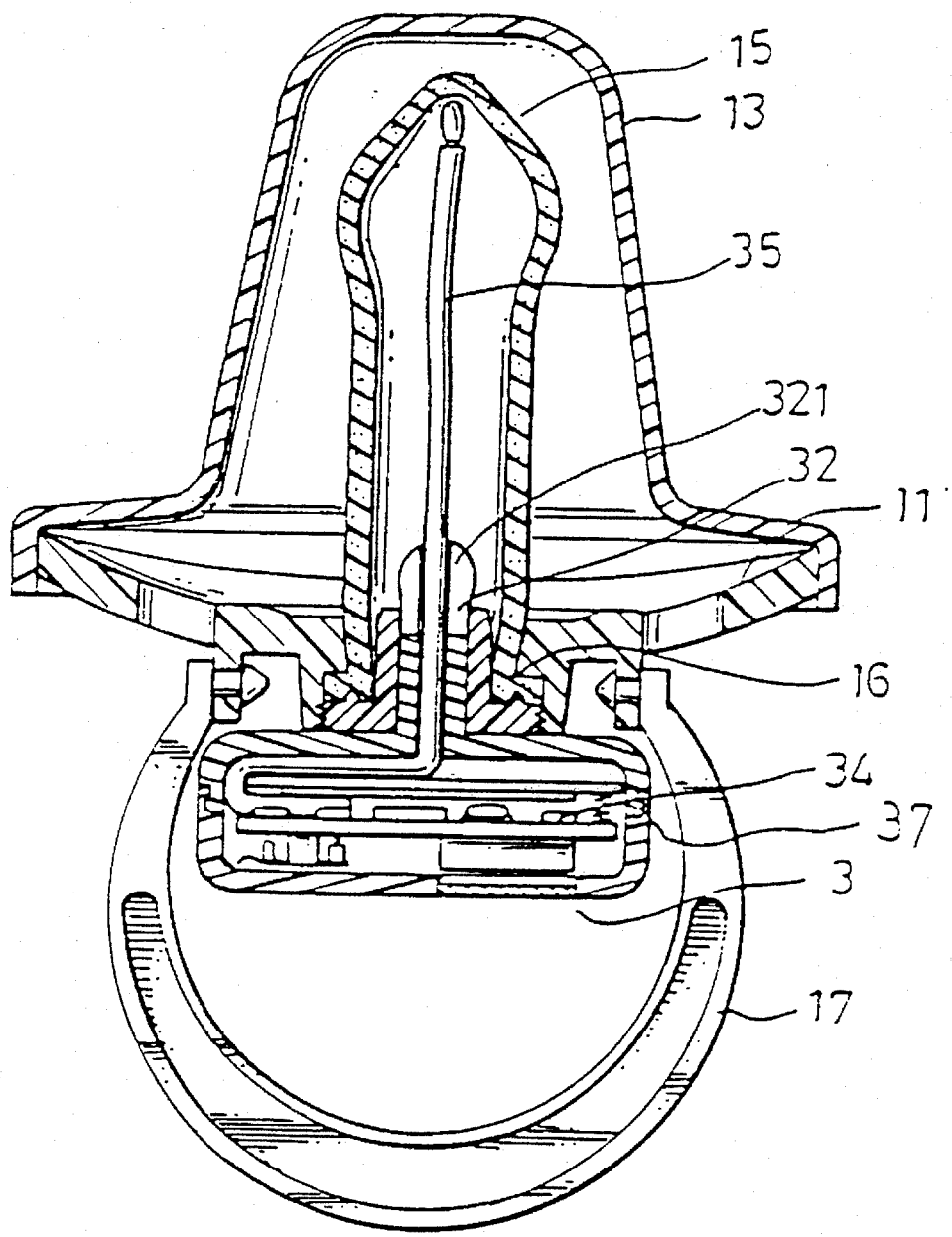
FIG. 3 is a sectional assembly view of the pacifier and thermometer assembly shown in FIG. 2.

Referring to FIGS. 2 and 3, a pacifier and thermometer assembly in accordance with the present invention is comprised of a pacifier 1, and a thermometer 3. The pacifier 1 is comprised of a base plate 11, a nipple 15, a locating member 2, a handle 17, and a nipple cover 13. The base plate 11 has a center hole 14 extending through a recessed portion thereof, a should portion 16 inside the center hole 14, and an inner thread 12 around the bottom end of the center hole 14. The nipple 15 is inserted through the center hole 14 of the base plate 11 from the bottom side and includes an outward flange 151 extending horizontally around the periphery of the bottom end. The diameter of the outward flange 151 is slightly larger than the inner diameter of the shoulder portion 16 so that when the nipple 14 is inserted through the center hole 14 of the base plate 11 from the bottom side, the outward flange 151 abuts the bottom of the shoulder portion 16. The locating member 2 is made from rigid material known in the art, and includes a circular bottom plate 21, an outer thread 23 around the periphery of the circular bottom plate 21 for threading into the inner thread 12 of the base plate 11, a center hole 25 extending through the center of the circular bottom plate 21, and a stub tube 22 extending upwardly from the circular bottom plate 21 around the center hole 25 for fitting into the center hole 14 of the base plate 11. The handle 17 has two opposite ends pivotably connected to two opposite locations at the bottom side of the base plate 11. The nipple cover 13 is covered on the base plate 11 over the nipple 15. The thermometer 3 is comprised of a casing 33, a cover shell 31, a probe 35, a control circuit 34, and an LCD (liquid crystal display) 38. The cover shell 31 is covered on the casing 33 to maintain the control circuit 34 and the LCD 38 on the side of casing 33, and includes a hollow coupling rod 32 at the top and a retaining groove 36 around the periphery thereof. The hollow coupling tube 32 has a rounded, split head 321. The outer diameter of the rounded, split head 321 of the hollow coupling rod 32 is slightly larger than the diameter of the center hole 25 of the locating member 2. The control circuit 34 is adhered to the inside wall of the cover shell 31. The probe 35 is inserted through the hollow coupling rod 32, and includes a top end projecting out of the rounded split head 321 of the hollow coupling rod 32 and a bottom end connected to the control circuit 34. The LCD 38 is installed in the control circuit 34. The casing 33 has a view window 39 corresponding to the LCD 38, and an inside coupling flange 37 is engageable with the groove 36 of the cover shell 31.

Figure 4:
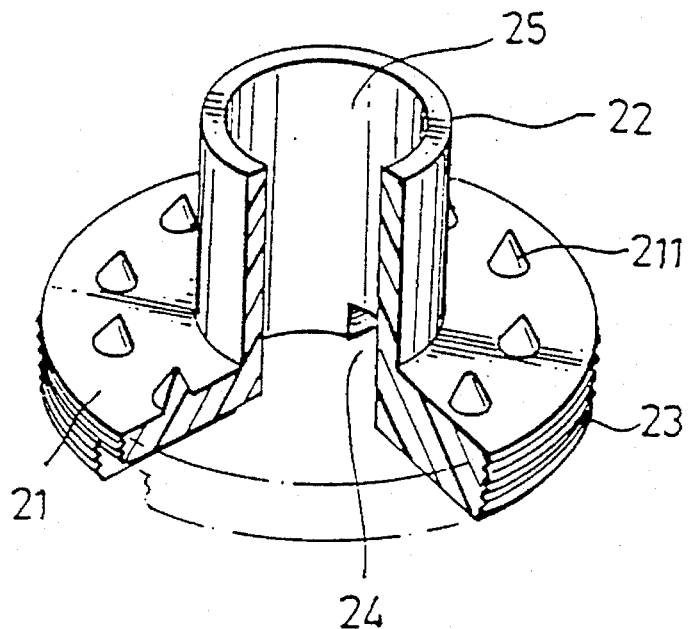
FIG. 4 is a partial perspective view of the locating member shown in FIG. 2.
Figure 5:
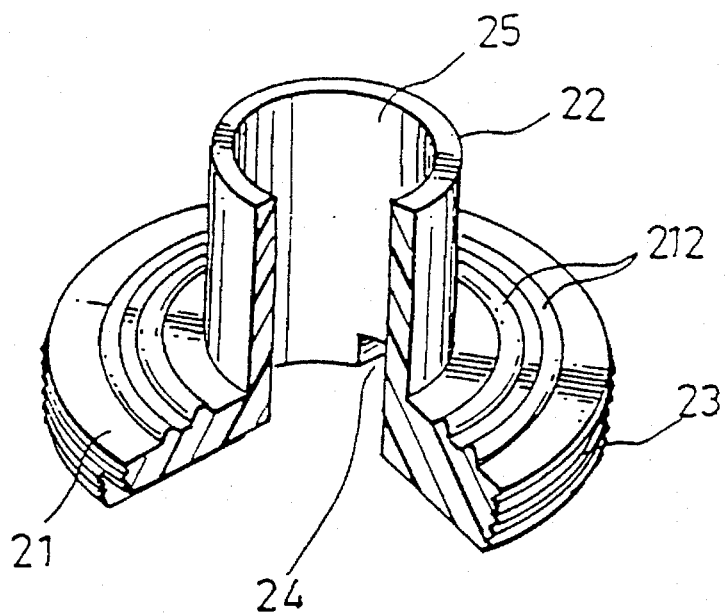
FIG. 5 is a partial perspective view of an alternate form of the locating member according to the present invention.

Referring to FIGS. 3, 4, and 5, when the outer threads 23 of the locating member 2 is threaded into the inner threads 12 of the base plate 11, the circular bottom plate 21 is abutted against the outward flange 151 of the nipple 15 which in turn is urged against the shoulder portion 16 of the base plate 11, thus firmly retaining nipple 15 to the base plate 11. Furthermore, anti-skid teeth 211 (see FIG. 4) or annular ribs 212 (see FIG. 5) may be provided at the top side of the circular bottom plate 21 of the locating member 2 and forced into engagement with the outward flange 15 1 of the nipple 15 to hold down the nipple 15. Also, notches 24 may be provided at the bottom side of the circular bottom plate 21 of the locating member 2 for permitting the locating member 2 to be turned into engagement with the base plate 11 by a tool. When the locating member 2, the nipple 15, and the base plate 11 are assembled, the connecting area is sealed by a bonding agent or by a high-frequency sealing apparatus.

Referring to FIGS. 2 and 3, the total length of the hollow coupling rod 32 is slightly longer than that of the stub tube 22 of the locating member 2. When the rounded split head 321 of the hollow coupling rod 32 of the cover shell 31 is inserted through the center hole 25 of the locating member 2 into the nipple 15, it initially deforms and thereafter immediately returns to its former shape above the stub tube 22 of the locating member 2, thus securing the thermometer 3 to the pacifier 1. When the cover shell 31 is pulled outwards from the locating member 2 by force, the thermometer 3 is disconnected from the pacifier 1.

Referring to FIGS. 2 and 3, when the pacifier 1 and the thermometer 3 are connected together, the probe 35 is suspended in the nipple 15, and therefore the body temperature of the baby is detected when the baby bites the nipple 15. When not used to detect the body temperature of the baby, the thermometer 3 is disconnected from the pacifier 1. Because the locating member 2 is fastened to the base plate 11 by a screw joint and then sealed by a bonding agent or by a high frequency sealing apparatus, disconnecting the thermometer 3 from the pacifier 1 does not cause the locating member 2 and the nipple 1 to be displaced.

It will be understood that the drawings are designed for purposes of illustration only, and are not intended as a definition of the limits and scope of the invention disclosed.

What the invention claimed is:

1. A pacifier and thermometer assembly comprising a pacifier and a thermometer detachably connected to said pacifier, wherein said pacifier comprises:

a base plate having a hole formed therethrough, a shoulder portion inside the hole of said base plate, and an inner thread around one end of the hole of said base plate;

a nipple inserted through the hole of said base plate, the nipple having an outward flange at one end abutting the shoulder portion of said base plate; and a locating member fastened to said base plate to secure said nipple to said base plate, said locating member comprising a circular bottom plate having an outer thread around the periphery threaded into the inner thread of said base plate, means located on top of said circular bottom plate for maintaining said nipple in close contact with one side of said base plate, a center hole formed through said circular bottom plate for receiving said thermometer, and a stub tube extending upwardly from said circular bottom plate around the center hole of said locating member and fitted into the hole of said base plate.

2. The pacifier and thermometer assembly of claim 1 wherein said thermometer comprises a casing having a view window, and an inside coupling flange;

a cover shell covered on said casing, said cover shell comprising a retaining groove around the periphery thereof disposed in engagement with the inside coupling flange of said casing, a hollow coupling rod at the center of the shell, the rod being inserted through the center hole of said locating member, said hollow coupling rod having a rounded split head disposed outside the stub tube of said locating member within said nipple;

a control circuit mounted inside said cover shell and having a probe inserted through the hollow coupling rod of said cover shell into the inside of said nipple for detecting temperature, said control circuit converting detected temperature signal from said probe into a digital electronic signal; and a liquid crystal display mounted inside said cover shell and facing the view window of said casing, the display being connected to said control circuit for converting the digital electronic signal from said control circuit into letters and displaying the letters.

3. The pacifier and thermometer assembly of claim 1 wherein said means for maintaining said nipple in close contact with said base plate includes a plurality of anti-skid teeth extending from a top side of the circular bottom plate of said locating member.

4. The pacifier and thermometer assembly of claim 1 wherein said means for maintaining said nipple in close contact with said base plate includes a plurality of anti-skid annular ribs extending from a top side of the circular bottom plate of said locating member.

\* \* \* \* \*